No. 787,258.

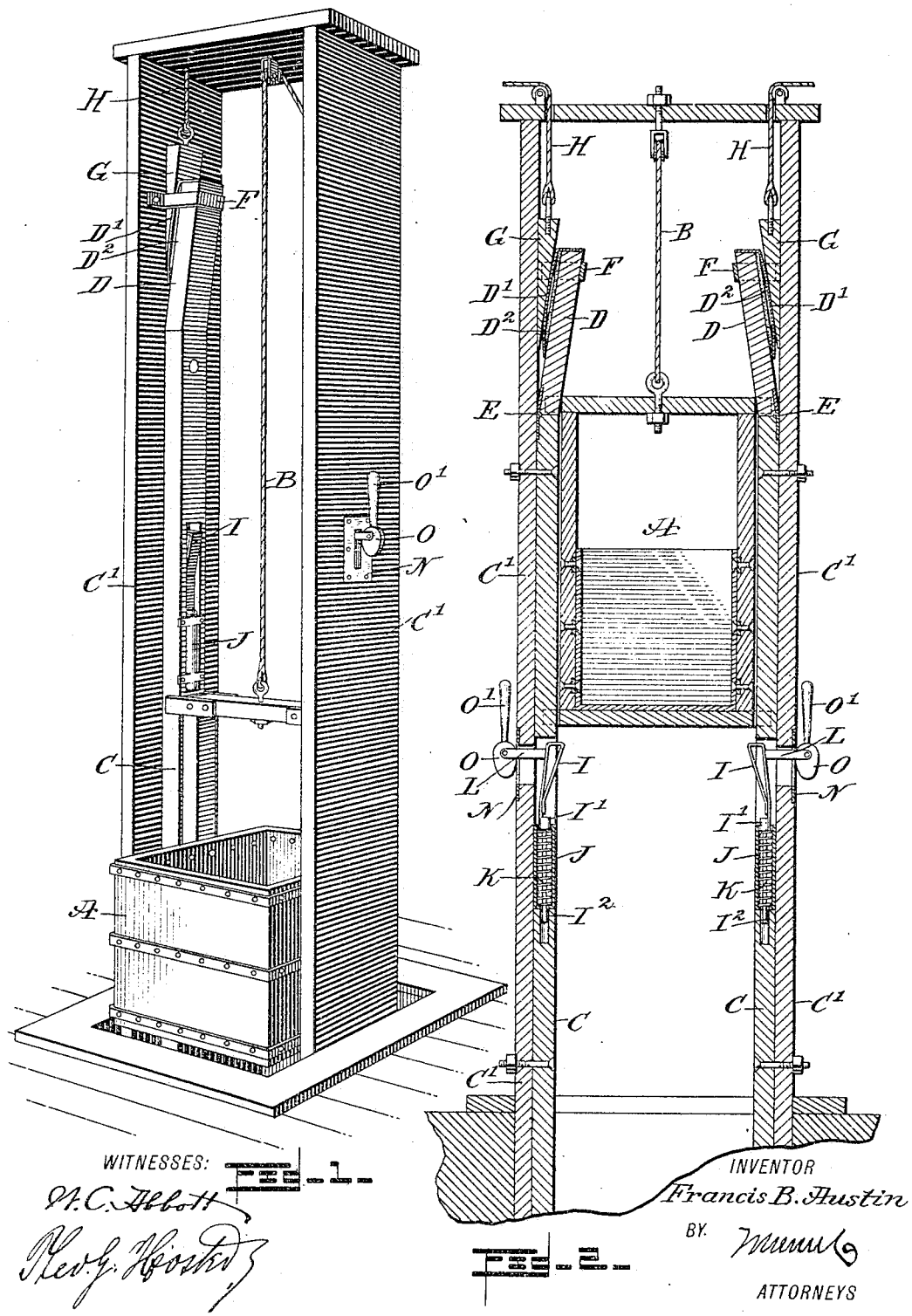

Patented April 11, 1905.

UNITED STATES PATENT OFFICE.

FRANCIS BREWSTER AUSTIN, OF TOMBSTONE, ARIZONA TERRITORY.

SAFETY DEVICE FOR ELEVATORS.

SPECIFICATION forming part of Letters Patent No. 787,258, dated April 11, 1905.

Application filed May 27, 1904. Serial No. 210,048.

*To all whom it may concern:*

Be it known that I, FRANCIS BREWSTER AUSTIN, a citizen of the United States, and a resident of Tombstone, in the county of Cochise and Territory of Arizona, have invented a new and Improved Safety Device for Elevators, of which the following is a full, clear, and exact description.

The object of the invention is to provide a new and improved safety device for elevators, more especially designed for use on mining-shafts, to prevent the cage from being drawn up too far on overwinding the hoisting-cable on the winding-up drum, to prevent the hoisting-cable from breaking, and the cage and its occupants from dropping down the mine-shaft.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1 is a perspective view of the improvement, and Fig. 2 is a sectional side elevation of the same.

The cage A is raised and lowered in the mine-shaft by being connected with the usual hoisting-cable B, leading to a winding-up drum, and the cage in its ascent and descent runs on the usual guideways C, attached to suitable supports C' in the shaft, the supports also extending above the shaft, usually in the form of a tower, which also carries a pulley over which passes the hoisting-cable to bring the same to the winding-up drum.

The guideways C terminate at their upper ends in guide-arms D, connected by hinges E with the top of the guideways, so as to form an extension thereof, and the said guide-arms D are inclined inwardly, as plainly illustrated in Figs. 1 and 2, and their inward movement is limited by yokes or stirrups F, attached to the supports C'. The back of each guide-arm D is spring-cushioned, and for this purpose a metal spring D' is provided, preferably a flat spring curved, as shown, with a cushion D², of felt or other material, interposed between the spring and the back face of the corresponding arm D. The spring D' normally rests against a wedge G, interposed between the spring and the support C', so as to hold the arm D normally in an inclined position, as shown, but to allow the arm to yield when pressed, owing to the action of the spring D'.

In case the engineer in charge of the hoisting-drum overwinds the cable B then the cage A is drawn up above its usual stopping-place on top of the mine, and consequently moves in engagement with the arms D, which are thus caused to swing outward on the springs D', yielding correspondingly, so that the cage A is practically clamped between the arms D, and consequently cannot be drawn up any farther.

A rope H or other suitable device is connected with each wedge G to allow of withdrawing the same whenever it is desired to release the cage A.

A distance below the arms D are arranged spring-rests I for engaging the bottom of the cage A to support the latter after the cage is released from the arms D on the withdrawal of the wedges G, as above described. The rests I are arranged in suitable recesses formed in the guideways C, and the inner faces of the said rests are inclined, so that when the cage A moves upward beyond its normal stopping place the said rests I are forced outward to allow the cage A to pass; but when the bottom of the cage has left the upper ends of the said rests I then the latter by their resiliency swing inward into the path of the bottom of the cage to form a rest for the cage whenever the latter is released from the arms D, as previously mentioned. The rests I have their lower ends secured on blocks I', mounted to slide in tubes J, secured in the guideways C, and in each tube J is arranged a coil-spring K, resting at its lower end on the bottom of the tube and pressing at its upper end against the under side of the block I' to yieldingly support the corresponding spring-rest I to allow the spring-rest to yield in a vertical direction when the cage A is seated on the said rests after being released. Each block I' is preferably provided with a guide-pin I², extending through the casing J and guided in the bottom thereof, as indicated in Fig. 2.

In case the cable is broken when the cage is drawn too far up, as above described, and the cage is released and rests on the rests I then after the cable is repaired and again connected with the cage it is necessary to withdraw the rests I from under the cage A to again permit of lowering the cage down into the mine.

In order to withdraw the rests I from under the bottom of the cage, the following device is provided. The outer side of each rest I is provided with an outwardly-extending arm L, passing through an elongated slot in a plate N, attached to the outer face of the support C'. The outer end of each arm L is pivotally connected with a cam-lever O, having a handle O' and resting with its peripheral face on the outer face of the plate N. By the operator taking hold of the handle O' and imparting a downward swinging motion to the same the cam-lever O pulls on the arm L in an outward direction, so as to withdraw the corresponding rest I within its recess and out of the path of the bottom of the cage to permit of lowering the cage as soon as both rests are withdrawn in the manner described.

By having the rests I mounted in the manner described all shock and jar incident to the dropping of the cage is taken up, and by providing the arms D with spring-cushions, as above set forth, it is evident that the cage A is gradually clamped between the arms when drawn up too far, so that the cage is not injured and its occupants are not subjected to undue shock or jar.

As shown in the drawings, the spring-rests I are located about the height of the cage A from the lower or hinged ends of the clamping-arms D D, and hence the rests I move into active position as soon as the bottom of the cage has passed the tops of the rest and before the top of the cage has entered between the clamping-arms D, so that in case the hoisting-cable B should break before the clamping-arms D sustain the cage and its load then the cage only drops a short distance—that is, until its bottom is seated on the rests I.

Having thus described my invention, I claim as new and desire to secure by Letters Patent—

1. A safety device for elevators, comprising spring-cushioned clamping-arms hinged to the upper ends of the guideways for the cage, and wedges on the spring-cushioned backs of the arms.

2. A safety device for elevators, comprising spring-cushioned clamping-arms hinged to the upper ends of the guideways for the cage, wedges on the spring-cushioned backs of the arms, and means for removably supporting the wedges.

3. A safety device for elevators, comprising spring-cushioned clamping-arms hinged on the upper ends of the guideways for the cage and forming extensions of the said guideways, wedges held removably on the spring-backs of the said clamping-arms, and means for limiting the inward swinging motion of the said clamping-arms.

4. A safety device for elevators, comprising spring clamping-arms at the upper ends of the guideways, for clamping the cage in position, and means for releasing the said arms.

5. A safety device for elevators, comprising spring-cushioned clamping-arms hinged to the upper ends of the guideways for the cage, wedges interposed between the said arms and the supports for the guideways, yokes attached to the supports for the guideways and limiting the inward movement of the said arms, and means connected with the wedges for withdrawing the same to release the cage.

In testimony whereof I have signed my name to this specification in the presence of two subscribing witnesses.

FRANCIS BREWSTER AUSTIN.

Witnesses:
F. N. WOLCOTT,
M. T. WILLIAMS.